(12) United States Patent
Davis

(10) Patent No.: US 9,033,238 B2
(45) Date of Patent: May 19, 2015

(54) METHODS AND ARRANGEMENTS FOR SENSING IDENTIFICATION INFORMATION FROM OBJECTS

(75) Inventor: Bruce L. Davis, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 13/231,893

(22) Filed: Sep. 13, 2011

(65) Prior Publication Data

US 2013/0048722 A1  Feb. 28, 2013

Related U.S. Application Data

(60) Provisional application No. 61/529,214, filed on Aug. 30, 2011, provisional application No. 61/531,525, filed on Sep. 6, 2011, provisional application No. 61/533,079, filed on Sep. 9, 2011.

(51) Int. Cl.
*G07G 1/00* (2006.01)
*G06K 7/10* (2006.01)
*G06K 7/14* (2006.01)

(52) U.S. Cl.
CPC ............ *G07G 1/0036* (2013.01); *G06K 7/1443* (2013.01); *G06K 7/1452* (2013.01); *G06K 7/1456* (2013.01); *G07G 1/0045* (2013.01); *G06K 7/10861* (2013.01)

(58) Field of Classification Search
USPC .................................................... 235/462.01
See application file for complete search history.

(56) References Cited

U.S. PATENT DOCUMENTS

| | | | | |
|---|---|---|---|---|
| 5,854,478 A | * | 12/1998 | Liu et al. | ............ 235/462.27 |
| 6,137,491 A | * | 10/2000 | Szeliski | .................. 345/419 |
| 7,537,170 B2 | | 5/2009 | Reed et al. | |
| 2005/0242186 A1 | * | 11/2005 | Ohbuchi | .............. 235/462.09 |
| 2007/0086679 A1 | | 4/2007 | Kudo et al. | |

(Continued)

FOREIGN PATENT DOCUMENTS

WO  WO2013033442  3/2013

OTHER PUBLICATIONS

PCT International Preliminary Report on Patentability, PCT/US2012/53201 (published as WO2013033442), mailed Mar. 4, 2014.

(Continued)

*Primary Examiner* — Christopher Stanford
(74) *Attorney, Agent, or Firm* — Digimarc Corporation

(57) ABSTRACT

In one arrangement, retail product packaging is digitally watermarked over most of its extent to allow machine identification by one or more inexpensive cameras at retail checkouts. Such a system also considers image fingerprints, product configuration, barcodes and other available information in identifying products. Imagery captured by conventional or plenoptic cameras is processed to derive several perspective-transformed views, which are provided to the identification system—increasing throughput by minimizing the need to manually reposition items for identification. Crinkles and other deformations in product packaging are optically sensed, allowing the surface to be virtually flattened to aid identification. A marked conveyor belt at the checkout station increases speed and accuracy, and provides other benefits to both shoppers and sellers. A great variety of other features are also detailed.

9 Claims, 8 Drawing Sheets

(56) References Cited

U.S. PATENT DOCUMENTS

2007/0272841 A1* 11/2007 Wiklof .................... 250/234
2009/0152348 A1   6/2009 Ostrowski et al.
2010/0158310 A1   6/2010 McQueen et al.
2010/0237150 A1*  9/2010 Patel et al. ............. 235/470
2011/0064298 A1   3/2011 Schlosser et al.

OTHER PUBLICATIONS

PCT International Search Report and Written Option of the International Searching Authority, PCT/US2012/53201 (published as WO2013033442), mailed Feb. 1, 2013.

* cited by examiner

METHODS AND ARRANGEMENTS FOR SENSING IDENTIFICATION INFORMATION FROM OBJECTS

RELATED APPLICATION DATA

The present application claims priority to applications 61/529,214, filed Aug. 30, 2011, 61/531,525, filed Sep. 6, 2011, and 61/533,079, filed Sep. 9, 2011.

TECHNICAL FIELD

The present technology concerns object identification, and is particularly illustrated in the context of identifying objects at supermarket checkout stations.

BACKGROUND AND SUMMARY

The widespread use of barcodes has greatly simplified supermarket checkout. However, many problems persist, causing both inconvenience for shoppers, and added costs for retailers.

One of the difficulties is finding a barcode on a package. While experienced supermarket clerks eventually learn barcode locations for popular products, even the best clerks sometimes have difficulty with less common products. For shoppers who use self-service checkout stations, any product can be confounding.

Another issue is that of re-orienting the package so that the barcode is in position for reading. Many items are straight-forward. However, particularly with large items (e.g., a carton of diapers, or a heavy bag of dog food), it can be a physical challenge to manipulate the product so that the barcode is exposed to the reader. Often in self-service checkout stations, the physical constraints of the checkout station compound the difficulty, as these stations commonly don't have the hand-held scanning capability with which conventional checkouts are equipped—forcing the shopper to manipulate the product so that barcode faces a glass scanning platen on the counter. (When properly positioned, the shopper may be unable to view either the platen or the barcode—exacerbating the difficulty.) Moreover, it is not enough for the barcode to be visible to the scanner; it must also be presented so as to roughly face the scanner (i.e., its surface normal must generally be within about 40-50 degrees of facing the scanning device in order to be read).

Sometimes a product is flipped and turned in search of a barcode, only to find there is none. Bottles of wine, for example, commonly lack barcodes.

Yet another issue is occasional difficulty in getting the scanning equipment to successfully read the barcode, after the barcode has been found and correctly positioned. This is a particular problem with malleable items (e.g., a package of frozen peas), in which the barcoded surface is crinkled or otherwise physically distorted.

To redress such issues, some have proposed identifying products with passive tags that can be sensed by radio (e.g., RFID and NFC chips). However, the costs of these tags are an obstacle in the low-margin grocery business. And it can be difficult to distinguish the responses from several different items on a checkout counter. Moreover, certain materials in the check-out queue may be radio-opaque—preventing some identifiers from being read. Privacy issues raise yet further concerns.

Other checkout technologies have also been tried. For example, in patent publication 20040081799, Kodak describes how a marking can be applied to supermarket packaging by adding a polymer layer that defines scannable information in the form of matte and glossy areas. The matte/glossy areas can form indicia such as barcodes, or digital watermarks. However, this technology requires applying a polymer layer to the packaging—a further expense, and an additional processing step that packagers are not presently equipped to provide.

Other identification technologies have been proposed for use in conjunction with barcode-based product identification. For example, patent application 20040199427 proposes capturing 2D imagery of products, and checking their color histograms against histograms associated with products identified by sensed barcode data, to ensure correct product identification. The same publication similarly proposes weighing articles on the conveyor—again checking for consistency with the barcode-indicated product. Publications 20040223663 and 20090060259 teach related arrangements, in which imagery of products is used to check for possibly switched barcodes.

U.S. Pat. No. 7,044,395 teaches that a watermark can replace a barcode, such as a UPC symbol or other standard product code, in a retail point of sale application. A reader unit at a checkout counter extracts a product identifier from the watermark, and uses it to look up the product and its price.

U.S. Pat. No. 4,654,872 describes a system employing two video cameras, which captures images of a 3D article, and uses the imagery to recognize the article. U.S. Pat. No. 7,398,927 teaches another two-camera system, this one to read product codes from articles despite specular reflections. U.S. Pat. No. 7,909,248 details a self-service checkout terminal in which captured imagery is compared against a database of reference imagery to try to identify a matching product.

In accordance with various embodiments of the present technology, certain drawbacks of the prior art are overcome, and new capabilities are provided.

For example, in one aspect, the present technology involves marking product packaging with a digital watermark that encodes related information (e.g., Universal Product Codes, such as UPC-A or UPC-E; Electronic Product Codes—EPC, European Article Number Codes—EAN, a URI or web address, etc.). The marking spans a substantial part of the packaging surface area, so that it can be sensed from one or more fixed cameras at a checkout station without repositioning of the item. The watermark indicia can be applied to the packaging along with other printing—integrated in the other packaging artwork.

In one such embodiment, a variety of recognition technologies are used at a checkout station—looking for different indicia of product identification (watermark, barcode, color histogram, weight, temperature, etc.). The system applies a set of rules to the collected evidence, and outputs a product identification based on the available information.

In another aspect, crinkles and other deformations in malleable product packaging are optically sensed, and are used in decoding an identifier from the distorted surface (e.g., the crinkled surface can be virtually flattened prior to decoding the identifier). In one particular such arrangement, the crinkled configuration is sensed by structure-from-motion techniques. In another, the product configuration is sensed by a structured light scanner (e.g., of the sort popularized by the Microsoft Kinect sensor).

In yet another aspect, a checkout station comprises a conveyor belt that includes markings that are optically sensed, and which are used to increase check-out speed and accuracy.

In still another aspect, imagery captured from an item being conveyor-transported at a checkout station is processed to compensate for motion blur, prior to applying a product recognition technology.

In yet another aspect, a plenoptic camera system senses information at a checkout station. The collected light field data is then processed to yield multiple different planes of focused imagery, to which product recognition technologies are applied. In some embodiments, these planes include a variety of non-parallel planes.

In still another aspect, 2D imagery acquired at a checkout station is applied to a GPU, which computes multiple perspective-transformed versions of the imagery—which are then analyzed for product recognition purposes. The GPU can process input imagery of several different focal lengths, e.g., captured by plural fixed-focus cameras, or by a camera that cyclically changes its focal plane, or by plenoptic sensing.

The foregoing and other features and advantages of the present technology will be more readily apparent from the following detailed description, which proceeds with reference to the accompanying drawings.

DETAILED DESCRIPTION

Figure 1A:
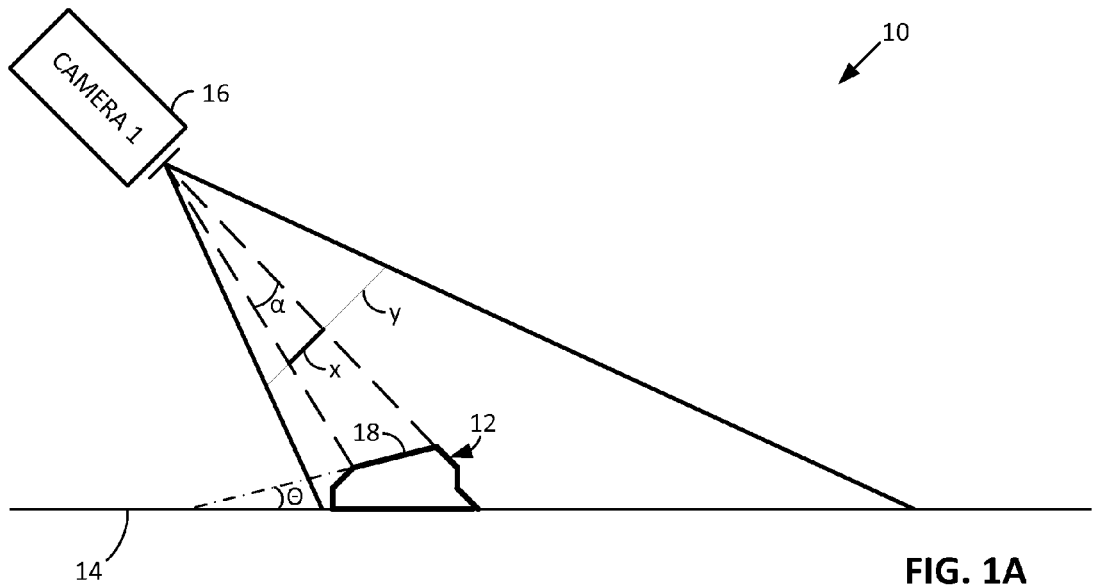
FIGS. 1A and 1B show a malleable item at two positions along a supermarket conveyor, being imaged by a camera.

In accordance with one aspect, the present technology concerns a method for identifying items, e.g., by a supermarket checkout system. A first such method involves moving an item to be purchased along a path, such as by a conveyor. A first camera arrangement captures first 2D image data depicting the item when the item is at a first position along the path. Second 2D image data is captured when the item is at a second position along the path. A programmed computer, or other device, processes the captured image data—in conjunction with geometrical information about the path and the camera—to discern 3D spatial orientation information for a first patch on the item. By reference to this 3D spatial orientation information, the system determines object-identifying information from the camera's depiction of at least the first patch.

In a variant embodiment, the second 2D image data is captured by a second camera arrangement—either when the item it at its first position or its second position along the path.

The object-identifying information can be a machine-readable identifier, such as a barcode or a steganographic digital watermark, either of which can convey a plural-bit payload. This information can additionally or alternatively comprise text—recognized by an optical character recognition engine. Still further, the product can be identified by other markings, such as by image fingerprint information that is matched to reference fingerprint information in a product database.

In some embodiments, the system processes the first and second 2D image data—in conjunction with geometrical information about the path and the camera—to discern second 3D spatial orientation information—this time for a second patch on the item. This second 3D spatial orientation information is typically different than the first 3D spatial orientation information. That is, the second patch is not co-planar with the first patch (e.g., the patches may depict different sides of a carton, or the surface may be deformed or wrinkled). By reference to the discerned first and second 3D spatial orientation information, the system determines identification information for the item. In such arrangement, the identification information is typically based on at least a portion of the first patch and a portion of the second patch. In the case of a barcode, for example, it may span both patches.

In like fashion, the system can determine the 3D pose of an arbitrary number of non-parallel patches on the item, and identify the item based on information from plural such patches.

In some embodiments, the item is moved by a conveyor belt that is provided with markings (e.g., printed or otherwise applied to its surface). These markings can be steganographic or overt. The imagery captured by the camera arrangement(s) includes at least some of these markings. The system analyzes the markings in the captured imagery in connection with the product identification. For example, the system can employ such markings to sense the speed of the conveyor, or to sense the distance to a point on an item resting on the conveyor, or to sense a size of the item on the conveyor, or to calibrate color information in the image(s) (e.g., white balance), or to provide an "image prior" useful in determining a deblurring kernel for motion blur compensation or for other image enhancement processing, etc.

In some instances, the markings are visible and promotional, yet can still serve as machine recognizable features useful in discerning the identity of products on the conveyor.

The foregoing will be made clearer by a particular example:

FIG. 1A shows a supermarket checkout station 10 in which an item 12 to be purchased is transported by a conveyor belt 14. A first camera 16 captures image data depicting the item.

Item 12 may be irregular in shape, such as a package of frozen peas. Its configuration can be regarded as a collection of adjoining surface patches (e.g., patch 18), each oriented at a different angle. (The orientation of a patch may be characterized by two angles. One is the angle (theta) relative to the lengthwise axis of the conveyor, i.e., the angle at which the plane of the patch intersects that lengthwise axis. The second is the angle (phi, not depicted in FIG. 1A) relative to the crosswise axis of the conveyor, i.e., the angle at which the plane of the patch intersects that cross-wise axis. Other geometries can of course be substituted.)

Camera 16 generates imagery in which each patch is depicted with a particular size, shape and position within the image frame, based on (1) the two orientation angles for the patch, (2) the 2D position of the item on the conveyor, i.e., both along its length and width; (3) the height of the patch relative to the conveyor; (4) the lens function of the camera; and (5) the patch geometry itself.

In FIG. 1A, the patch 18 subtends an angle alpha (α). In the depicted representation, this patch spans a distance "x" across the camera sensor's field of view "y"—corresponding to a particular range of sensing elements in the camera's sensor (typically CCD or CMOS).

Figure 1B:
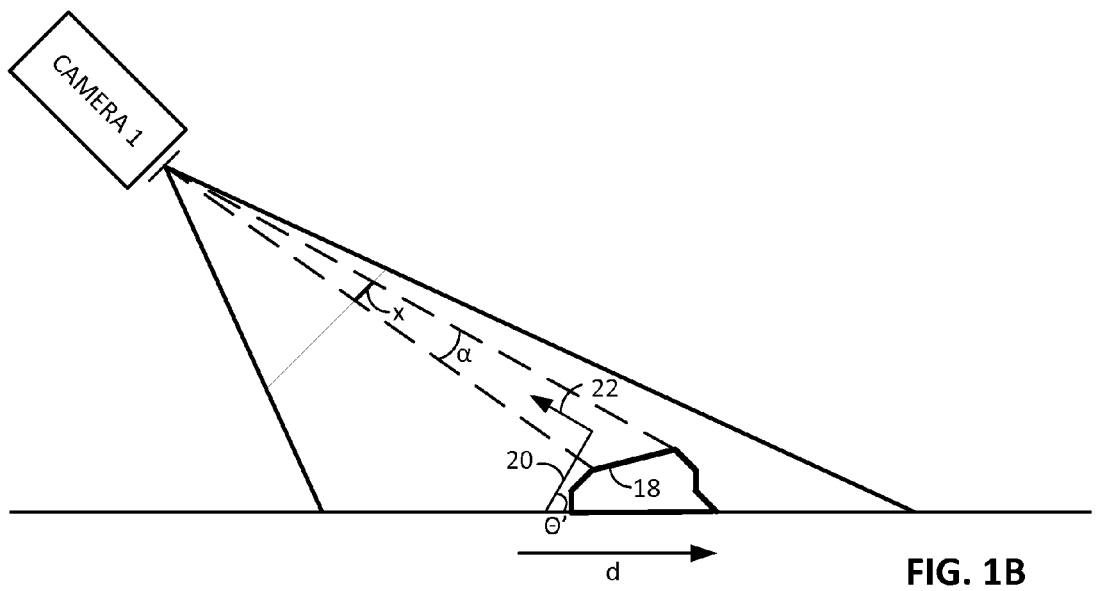

A moment later, the package of peas 12 has moved a distance "d" along the conveyor, as shown in FIG. 1B. The angle alpha has changed, as has the span "x" of the patch across the sensor's field of view.

By reference to known parameters, e.g., the conveyed distance d, the change in pixels spanned by the patch (which correlates with the angle alpha), and the camera lens function, the system determines the angle theta in FIG. 1B (and also in FIG. 1A).

Once the angle theta has been determined, an exemplary system performs a perspective-transform (e.g., an affine-transform) on the depiction of the patch 18 in the FIG. 1B captured imagery, to yield transformed imagery that compensates for the angle theta. That is, a transformed patch of imagery is produced in which the patch appears as if it lies in plane 20, with an angle θ' that is perpendicular to a ray 22 from the patch to the camera lens.

In like fashion, the angle phi (not shown in FIG. 1B, due to the side view) can be determined. Again, the depiction of the patch 18 can be correspondingly transformed to compensate for this angle phi, to yield a virtually reoriented patch that lies in a plane perpendicular to ray 22.

Techniques for deriving the 3D geometry of patch 18 from the captured imagery are familiar to those skilled in the art, and include "structure from motion" and "simultaneous location and mapping" (SLAM) methods. Other implementations used structured light scanning methods. Such techniques are further detailed below.

All of the other patches comprising item 12, which are viewable by the camera in both FIG. 1A and FIG. 1B, can be similarly transformed. Such transformations can similarly transform the scale of the depicted patches so that each appears—after transformation—to lie the same distance from the camera sensor, perpendicular to the camera axis.

By such processing, the system renders a virtually flattened package of peas (or other 3D shape)—presented as if its component face patches are coplanar and facing the camera.

Figure 2A:
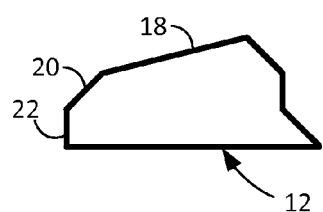
FIGS. 2A and 2B shows how an item with several component planar surfaces can be virtually "flattened" to aid in item identification.
Figure 2B:
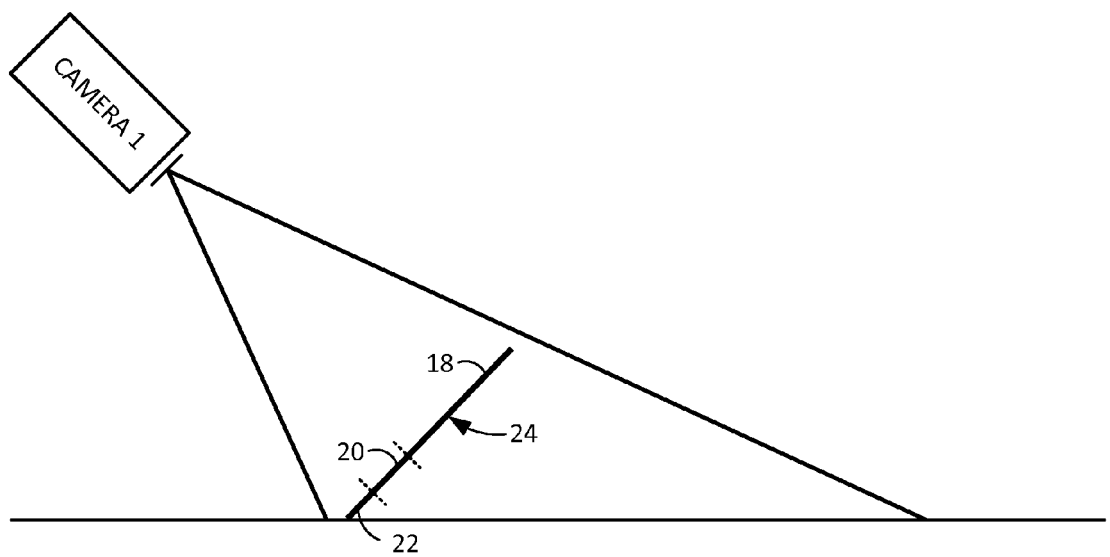

FIGS. 2A and 2B schematically illustrate this virtual flattening. Item 12 includes three component patches 18, 20 and 22, lying in different planes. These patches are imaged by camera 16, from two (or more) different perspectives (e.g., as the item is moved along the conveyor). Based on such information, the system determines the location of the three patches in 3D space. It then re-projects the three patches to lie in a common plane 24 at the center of the camera's field of view, as if facing the camera, i.e., parallel to the camera's image sensor. (Dashed lines separate the three component re-projected surfaces in FIG. 2B. Of course, this illustration only shows virtual flattening of the surface along one dimension. A preferred implementation also virtually flattens the surface along the crosswise dimension of the conveyor, i.e., into the page.)

To this set of re-mapped image data, an extraction process is applied to generate identification data corresponding to the item. The preferred embodiment applies a digital watermark decoding algorithm, but other identification technologies (e.g., barcode decoding, image fingerprinting, etc.) alternatively can be used.

If a watermark or barcode is present on item 12, it can likely be decoded, regardless of the irregular configuration or presentation of the item on the conveyor. Such marking may be found within a single patch, or it may span two or more patches. In a preferred embodiment, the digital watermarking spans a substantial portion of the packaging extent. In regions where there is no printing (e.g., white space), a yellow or other unobtrusive watermark tint can be applied. (Yellow watermarking is particularly discussed, e.g., in application Ser. No. 12/774,512, filed May 5, 2010, and U.S. Pat. No. 6,345,104.)

In some embodiments, it is not necessary to virtually reorient the patch(es) to compensate for both angles theta and phi. Because many decoders are tolerant of some angular skew, a partial angular compensation of the patch(es), in theta and/or phi, is often sufficient for reliable decoding. For example, the patches may be remapped so they all have the same theta angle, but various phi angles. Or a partial correction in either or both of those dimensions can be applied. (A partial correction may be effected through use of affine transforms, whereas a perfect correction may require non-affine, perspective transforms.)

Image fingerprinting techniques (e.g., SIFT, SURF and ORB) that are used for object identification are also somewhat robust to non-plan views of the object. Yet some virtual remapping of the imagery to reduce the angular variance between the component patch planes is helpful to assure best results.

The distance along the conveyor can be determined by reference to the difference in times at which the images of FIGS. 1A and 1B are captured, if the conveyor velocity is uniform and known. As noted, the belt may be provided with markings by which its movement alternatively can be determined. (The markings can be promotional in nature, e.g., Tony the Tiger, sponsored by Kellogs.) In still other embodiments, a conveyor is not used. Instead, the item is moved past the camera by hand. In such case, the distance and other path parameters can be estimated by feature tracking, from features in the captured imagery. Alternatively, a structured light scanning arrangement can be employed.

In some implementations, the speed of the conveyor varies in accordance with signals from a control unit, e.g., operated by a cashier's foot. The speed can be sensed by a electro-mechanical arrangement (e.g., a roller wheel and an optical chopper) or from analysis of the captured imagery. Such knowledge of the conveyor speed can be used in extracting identification information relating to objects on the conveyor (e.g., re mitigating motion blur before extracting identification information, etc.).

Figure 3A:
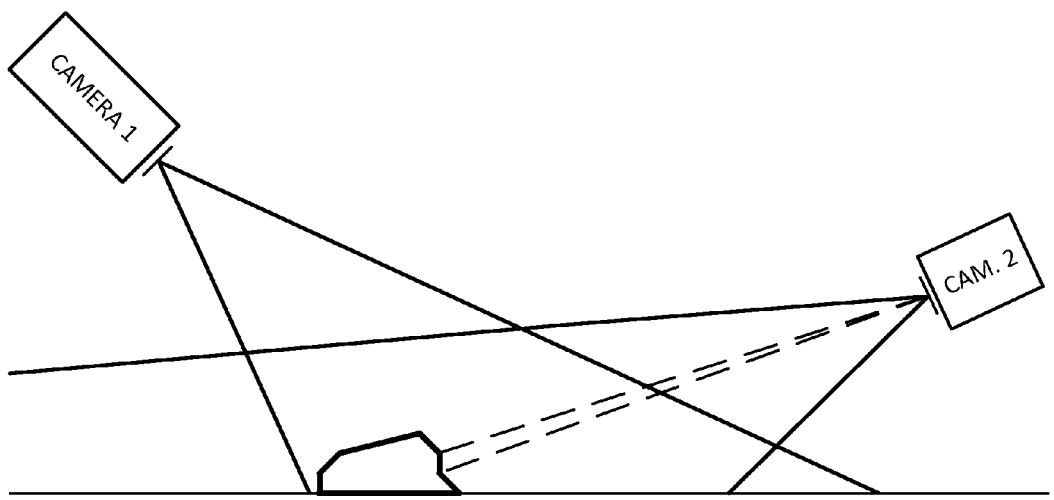
FIGS. 3A and 3B are similar to FIGS. 1A and 1B, but show the item being imaged by two cameras.
Figure 3B:
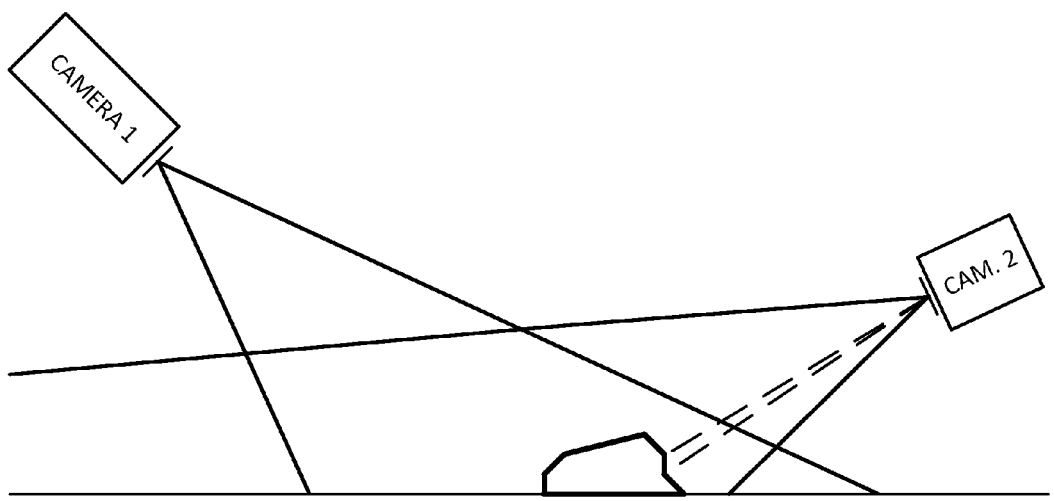

FIGS. 3A and 3B show a further arrangement in which two cameras are used. Such arrangement allows image capture from patches of the item that may not be visible to a single camera. In such embodiment, the cameras may be at different elevations relative to the conveyor (including below, e.g., looking up through a glass platen). They may also be oriented at different angles (theta and/or phi) relative to the conveyor. They can also be spaced at different positions along the length of the conveyor, so that the time intervals that the item is viewed by the two cameras are not co-extensive. That is, the first camera captures imagery of the item during a first period, and the second camera captures imagery of the item during later period (which may, or may not, overlap with the first period). If a patch is visible to both cameras, the additional captured imagery allows more accurate virtual transformation of the depicted image patches to facilitate identifier discernment. A virtual planar reconstruction of the package surface is desirably generated using imagery from the two cameras.

In other embodiments, three or more camera arrangements can be used.

In accordance with another aspect of the present technology, the checkout station captures imagery of different colors, e.g., by illuminating the area with different colors of light. The different colors of imagery can be captured simultaneously (e.g., by different cameras) or serially. The different frames of information can be processed to generate different information, or to serve different purposes.

One particular implementation illuminates the conveyor surface with a repeating sequence of three colors: white, infrared, and ultraviolet. Each color is suited for different purposes. For example, the white light can capture an overt product identification symbology; the ultraviolet light can excite anti-counterfeiting markings on genuine products; and the infrared light can be used to sense markings associated with couponing and other marketing initiatives.

Different frames of captured imagery can be utilized to synthesized enhanced frames of imagery for use as described above (e.g., product identification, anti-counterfeiting, and marketing).

Other aspects of the present technology make use of one or more plenoptic cameras (sometimes termed multi-aperture sensors, radiance cameras, or light field cameras). Some such cameras employ an array of plural component cameras, typically formed on a common substrate, each with its own lens. These cameras may be viewed as sensing a 4D light field. From their collected data, they can produce frames of data at arbitrary focal planes. This allows captured imagery to be "focused after the fact."

Figure 4A:
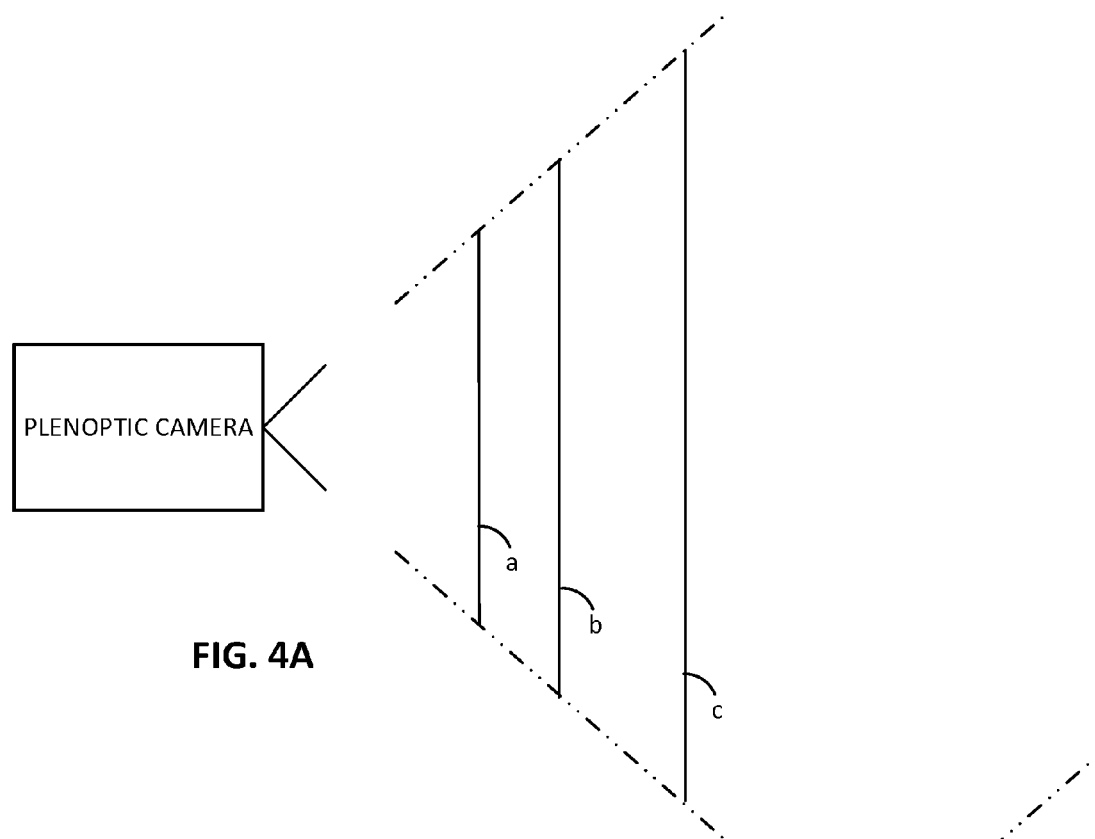
FIGS. 4A and 4B illustrate how a plenoptic sensor can be used to generate different planes of focused imagery within an imaging volume, including parallel planes and non-parallel planes.

For example, in FIG. 4A, a plenoptic camera system processes the data captured by its component sensors to yield a frame focused at focal plane "a." The same data can also be processed to yield a frame focused at focal plane "b" or "c."

Figure 4B:
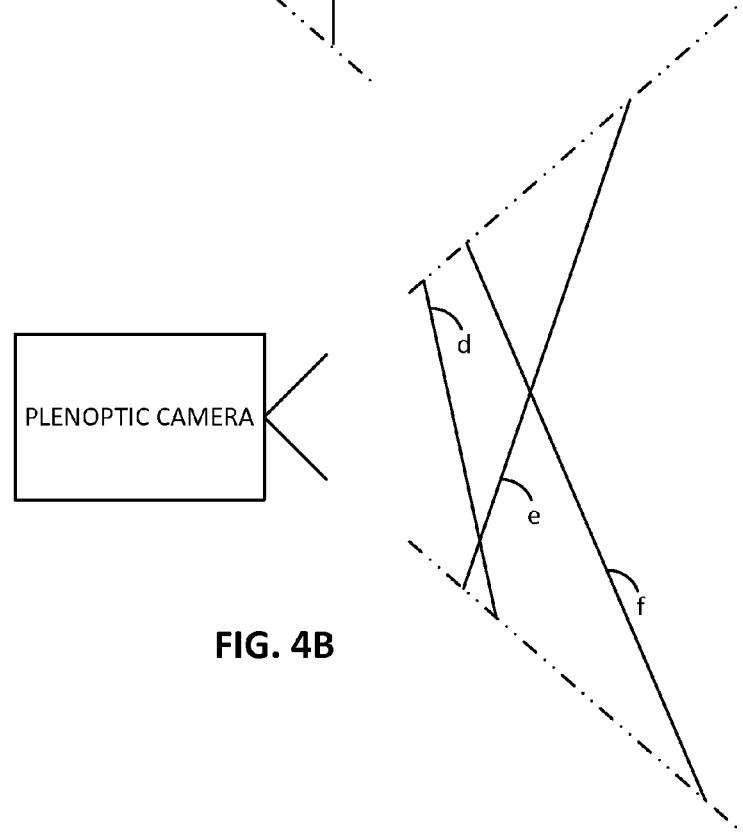

The focal planes needn't be parallel, as shown in FIG. 4A. Instead, they can be non-parallel (e.g., focal planes "d," "e" and "f" in FIG. 4B). One particular technique for synthesizing tilted focal plane imagery is known to artisans from Vaish et al, Synthetic Aperture Focusing a Shear-Warp Factorization of the Viewing Transform, 2005 IEEE Computer Society Conference on Computer Vision and Pattern Recognition, pp. 129-136.

One method involves capturing information from an item to be purchased using a plenoptic camera. The captured plenoptic information is processed to yield a first set of imagery having a focal plane coincident with a first plane through a volume that encompasses at least part of said item. The plenoptic information is also processed to yield a second set of imagery having a focal plane coincident with a second plane through said volume, where the first and second planes are non-parallel. The thus-processed information is then analyzed to discern object identification information.

Figure 5:
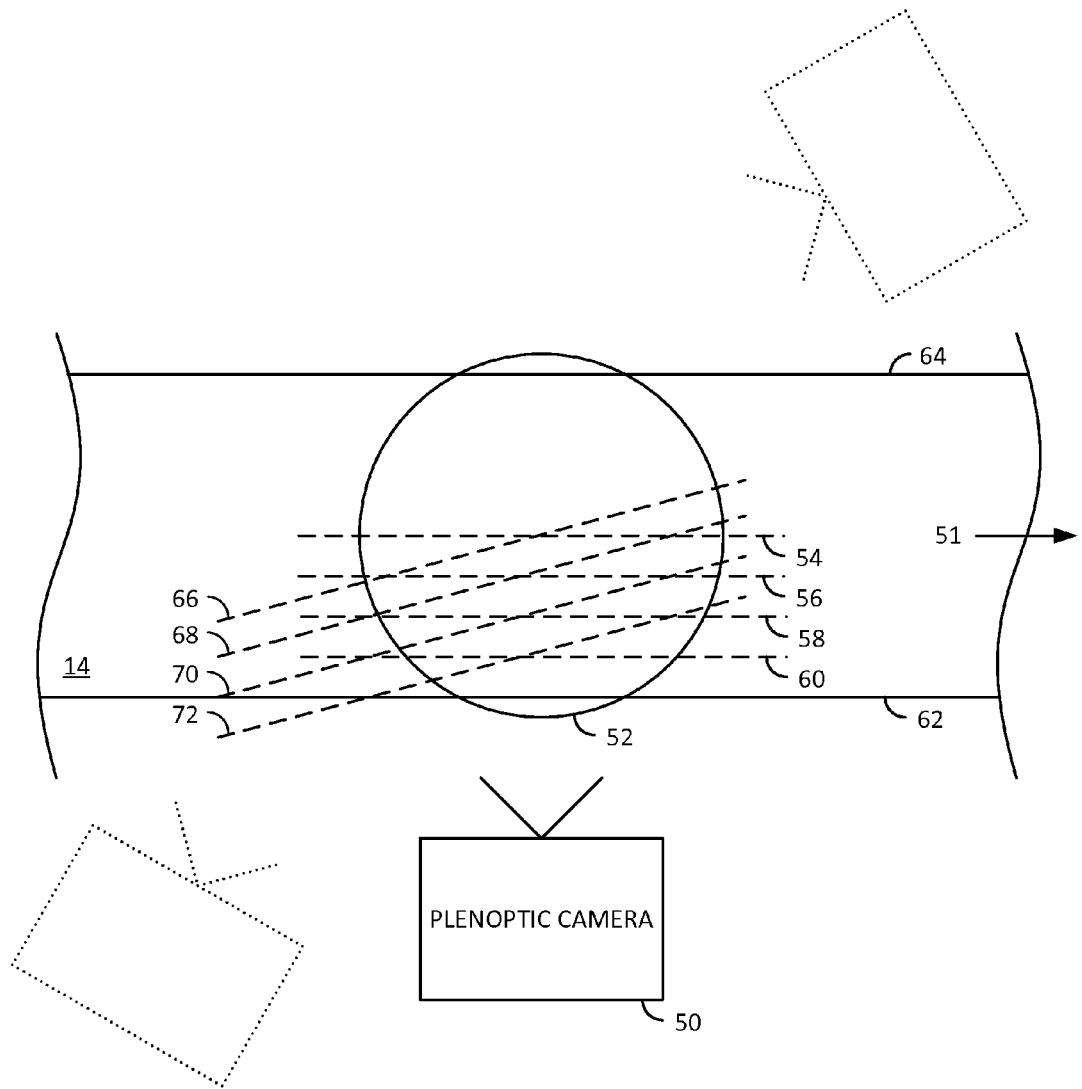
FIG. 5 illustrates a supermarket checkout conveyor that is imaged by a plenoptic camera system, allowing extraction of multiple frames of imagery at different focal planes.

Referring to FIG. 5 (which is a plan view looking down on a conveyor of an exemplary embodiment), the plenoptic information from camera 50 is processed to yield many different focal planes of imagery through a volume that encompasses the items on the conveyor. If the items are imagined as occupying a hemispherical region 52 on the conveyor 14, one focal plane 54 (shown in dashed lines) extends vertically up from the central axis 51 of the conveyor, bisecting the hemisphere. Three other planes 56, 58, 60 similarly extend up perpendicularly from the plane of the conveyor, spaced successively three inches closer to the edge 62 of the conveyor. (Three further planes—not shown, for clarity of illustration—are similarly disposed near the other edge 64 of the conveyor.)

In addition to this first plurality of parallel planes, the plenoptic data is also processed to yield a second plurality of focal planes that again extend vertically up from the plane of the conveyor, but are skewed relative to its central axis 51. The depicted planes of this second plurality, 66, 68, 70 and 72 correspond to the planes of the first plurality, but are skewed +15 degrees.

Although not shown in FIG. 5 (for clarity of illustration), additional sets of focal plane imagery are similarly derived from the plenoptic camera data, e.g., oriented at skew angles of +30, +45, and +60 degrees. Likewise, such planes are generated at skew angles of −15, −30, −45, and −60 degrees.

All the just-described planes extend vertically up, perpendicularly from the conveyor.

The plenoptic information is also processed to yield tilted focal planes, i.e., that do not extend vertically up from the conveyor, but instead are inclined. Counterparts to each of the above-described planes are generated at a tilt angle of 15 degrees. And others are generated at tilt angles of 30, 45 and 60 degrees. And still others are generated at tilt angles of −15, −30, −45, and −60 degrees.

Thus, in this exemplary embodiment, the plenoptic information captured by camera 50 is processed to yield a multitude of different focal planes of image information, slicing the hemispherical volume with planes every three inches, and at every 15 degrees. The resulting sets of image information are then analyzed for product identification information (e.g., by applying to watermark decoder, barcode decoder, fingerprint identification module, etc.). Depending on the location and orientation of the item surfaces within the examined volume, different of these planes can reveal different product identification information.

While plenoptic cameras are generally conceived as full color devices, they needn't be so for product identification. For example, a watermark signal may be encoded in product packaging in a red channel, and a corresponding monochrome (red) plenoptic camera can be used for decoding. In such a camera, the usual four-cell Bayer pattern of red/green/green/blue can be eliminated, and all of the sensor elements can sense red alone.

(Although described with reference to a single plenoptic camera, actual implementations can use two or more cameras, as shown in dotted lines in FIG. 5. Information from such plural cameras can be combined or otherwise used in concert.)

While detailed in connection with an embodiment employing plenoptic information, this concept of examining plural different focal planes of imagery for product identification information can be implemented in other manners. One is to use a fixed focus camera to capture a single plane of imagery, and provide the imagery to a GPU that applies a collection of different image transformations. For example, the GPU can apply a +15 degree corrective perspective transform. This process has the effect of taking any physical surface inclined −15 degrees relative to the image focal plane (i.e., inclined −15 degrees to the camera sensor in typical embodiments), and warp it so that it appears as if it squarely faced the camera. (Desirably, the scene is adequately lit so that the captured imagery has a depth of field of many inches.) The GPU can similarly re-project the original imagery at horizontal tilts of −60, −45, −30, −15, +15, +30, +45, and +60 degrees, and at vertical tilts −60, −45, −30, −15, +15, +30, +45, and +60 degrees. It can likewise warp the original image at each combination of these horizontal and vertical tilts. Each resultant set of image data can be processed by an identification module to extract object identification information.

(Before applying the captured image data to the GPU for perspective transformation, or before applying the GPU-transformed image data to the identification module, the data is desirably examined for suitable focus. Focused regions can be identified by their high frequency content, or their high contrast, as compared with out-of-focus imagery. Imagery that is determined to be out of focus needn't be further processed.)

If the depth of field of a conventional fixed focus camera is not adequate, known extended depth of field imaging techniques can be used (see, e.g., U.S. Pat. Nos. 7,218,448, 7,031,054 and 5,748,371).

In still other arrangements, the system uses a variable focus camera, and its focal plane is cyclically changed (e.g., mechanically or by fluid motion) to capture successive planes of imagery at different focal lengths. These images are provided to a GPU to apply different image transformations, as detailed above.

A GPU is well suited for use in the just-detailed arrangement, because it employs a plurality of processing cores to execute similar instructions on several sets of data simultaneously. Such a GPU can likewise be employed to perform a watermark or barcode decoding operation, or a fingerprint extraction operation, on multiple sets of data (e.g., the differently-transformed image sets) simultaneously.

A GPU can also be used to perform processing of information acquired by a plenoptic camera arrangement. For example, a GPU can extract the different planes of focused imagery. Or another processor can extract parallel planes of focused imagery (e.g., planes 54-60 in FIG. 5), and then a GPU can perspective-transform these parallel planes to yield a diversity of other planes that are not parallel to planes 54-60. In still other arrangements, a GPU is employed both to process the captured information (to yield multiple sets of imagery in different focal planes), and also to process the multiple sets of imagery to extract identification information. In yet other arrangements, multiple GPUs are used, including in embodiments with multiple cameras.

Figure 8:
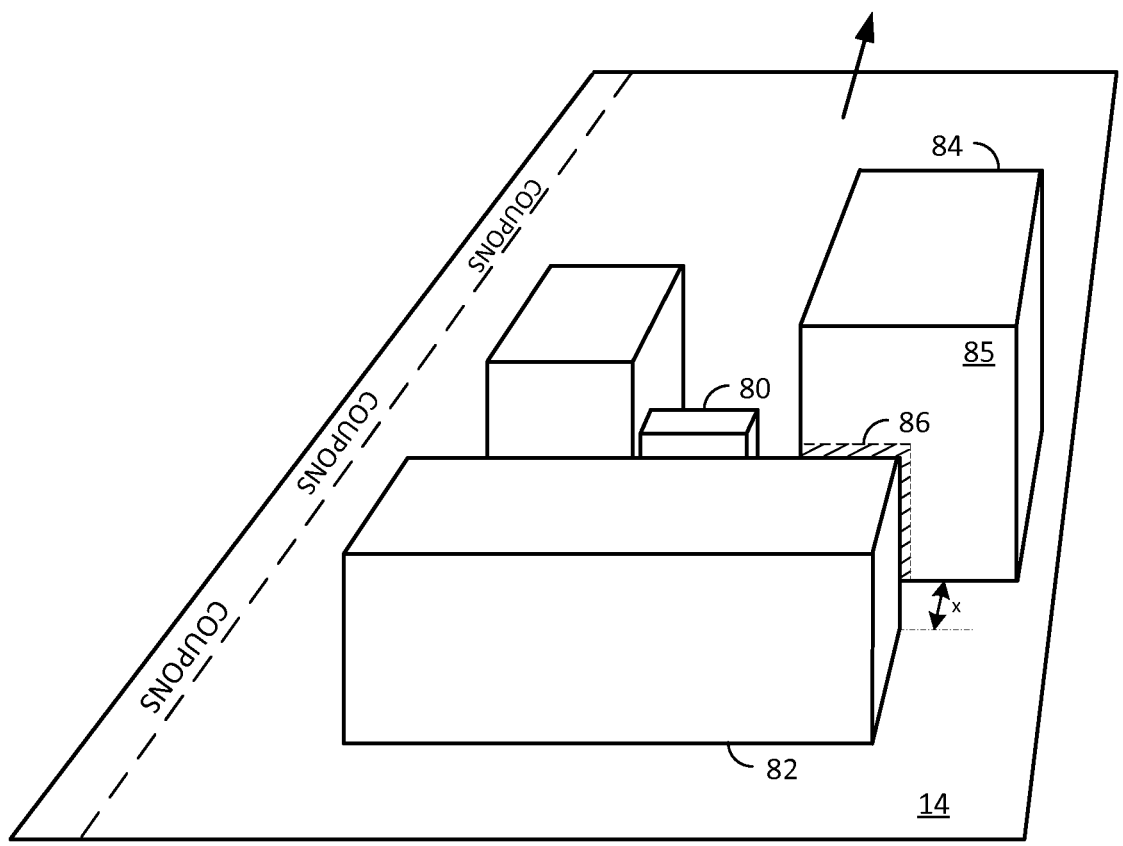
FIG. 8 is a perspective view of items on a checkout conveyor.

FIG. 8 shows a checkout conveyor 14 carrying various items for purchase, from the perspective of an illustrative imaging camera. The items are arranged on the conveyor in such a manner that item 80 is largely obscured. Its position may be such that no barcode is ever visible to any camera as the item passes along the conveyor, and its visible surfaces may be too small to enable object recognition based on other technologies, such as image fingerprinting or digital watermarking.

In accordance with another aspect of the present technology, a 3D image segmentation algorithm is applied to determine the different shapes on the conveyor. The system associates the different segmented shapes on the conveyor with the different object identifiers derived from sensor information. If there is a mismatch in number (e.g., segmentation shows four items on the FIG. 8 conveyor, but the system may output only three product identifications), this circumstance is flagged to the operator. Image data highlighting the outlier item (i.e., item 80 in FIG. 8) can be provided to a supervisor, and/or a diverter can divert the item from the flow of items through checkout—for manual processing without stopping other checkout progress.

(For a review of illustrative segmentation algorithms, see, e.g., Wirjadi, Survey of 3d Image Segmentation Methods, Reports of Fraunhofer ITWM, No. 123, 2007. Two popular classes of segmentation techniques are thresholding and region growing. Related technology for dimensioning objects on a supermarket conveyor is detailed in U.S. Pat. No. 7,344,082.)

In accordance with a further aspect of the present technology, the checkout conveyor of FIGS. 1 and 8 moves at a uniform rate. However, frames of imagery are not similarly captured at a uniform intervals. Instead, the system captures frames at non-uniform intervals.

For example, the camera imagery may reveal a gap between items in the longitudinal direction of the conveyor. (Such a gap "x" is shown between items 82 and 84 of FIG. 8.) When such a gap is present, it presents an opportunity to capture imagery depicting a product face that may be exposed only briefly (e.g., part 86 of face 85 of item 84 that is generally occluded by item 82). The system controls the camera to capture an image frame when part 86 is maximally revealed. If this instant comes at time t=175 ms, and the system normally captures image frames at uniform intervals of 50 ms, then an extra frame is captured at t=175 ms (e.g., frames captures at 0 ms, 50 ms, 100 ms, 150 ms, 175 ms, 200 ms . . . ). Alternatively, the system may delay or advance a regular frame of image capture so as to capture a frame at the desired instant (e.g., 0 ms, 50 ms, 100 ms, 175 ms, 200 ms, 250 ms . . . ). Such an event-driven frame capture may establish the timing by which subsequent frames are uniformly captured (e.g., 0 ms, 50 ms, 100 ms, 175 ms, 225 ms, 275 ms . . . ).

In an alternative arrangement, frame capture is performed at regular intervals. However, the system slows or pauses the conveyor 14 so as to allow image capture from a surface that is only briefly visible to the camera (e.g., part 86). After such image has been captured, the conveyor resumes its normal motion.

In some embodiments, information determined through one recognition technology is useful to another. For example, by color histogram analysis, the system may make a tentative identification of an item as, e.g., a six-pack of Coke. With this tentative identification, the system can obtain—from the database—information about the configuration of such product, and can use this information to discern the pose or orientation of the product as depicted in the camera imagery. This pose information may then be passed to a digital watermark decoding module. Such information allows the watermark decoding module to shortcut its work (which typically involves making its own estimation of spatial pose).

In another example, image fingerprinting may indicate that an item is likely one that conveys a digital watermark on its packaging. The image fingerprinting may also provide information about the item's affine representation within the captured imagery. The system may then determine that if the image is rotated clockwise 67 degrees, the watermark will be easier to read (e.g., because it is then restored to its originally encoded orientation). The system performs a virtual 67 degree rotation of the imagery, and then passes it to a watermark decoding module.

Watermark indicia—like barcode indicia—cannot be decoded properly if they are depicted at too great an angular skew. In accordance with another aspect of the present technology, products for sale in a retail store are watermarked with multiple watermarks—pre-distorted to aid off-axis reading. In an exemplary arrangement, the watermark pattern (e.g., a watermark tile, as detailed in U.S. Pat. No. 6,590,996) is affine-distorted eight different ways (horizontally/vertically). The eight affine-transformed tiles are summed with the original tile, and this composite pattern is applied to the product or its packaging. The following Table I shows the nine component watermark tiles:

TABLE I

| | |
|---|---|
| 1 | Original watermark tile |
| 2 | Original tile, affine-transformed 30 degrees to right |
| 3 | Original tile, affine-transformed 30 degrees to right, and 30 degrees upwardly |
| 4 | Original tile, affine-transformed 30 degrees upwardly |

TABLE I-continued

5  Original tile, affine-transformed 30 degrees to left, and 30 degrees upwardly
6  Original tile, affine-transformed 30 degrees to left
7  Original tile, affine-transformed 30 degrees to left, and 30 degrees downwardly
8  Original tile, affine-transformed 30 degrees downwardly
9  Original tile, affine-transformed 30 degrees to right, and 30 degrees downwardly If a product surface bearing this watermark pattern is tilted up, away from the camera by 45 degrees, component tile #8 in the above list still will be readily readable. That is, the 45 degrees of upward physical tilt, counteracts the 30 degrees of downward affine transformation of tile #8, to yield a net apparent upward skew of 15 degrees—well within the reading range of watermark decoders.

(In a variant embodiment, the composite watermark tile additionally or alternatively includes component tiles of different watermark scales. Similarly, the composite watermark tile can include component tiles that have been warped in non-planar fashion. For example, different curvilinear warps can be used in anticipation of sensing watermarks from curved surfaces, such as canned goods, viewed from different perspectives.)

In existing checkout stations, spinning mirrors are sometimes used to effect physical scanning of laser beams across product packaging. In accordance with a further aspect of the present technology, moving minors are used with camera systems to introduce different perspective distortions in imagery provided to product identification modules.

For example, a camera may face a segmented cylinder having nine different mirrored surfaces. The cylinder may be turned by a stepper motor to successively present different of the mirrors to the camera. Each mirror reflects a differently-warped view of checkout items to a camera. These different warps may be, e.g., the nine different transformations detailed in Table I. For one frame capture, the cylinder presents an unwarped view of the imagery to the camera. For a next frame capture, the cylinder presents a view of the imagery as if skewed 30 degrees to the right, etc. The resulting sequence of frames can be provided, e.g., to a watermark decoder or other product identification module, for generation of product identification information.

In a related embodiment, moving mirrors serve to extend a camera's field of view—presenting scenes to the camera sensor that are otherwise outside the field of view of the camera lens.

Other Remarks

Having described and illustrated various particular features and arrangements, it will be recognized that the technology is not so limited.

For example, while applicant particularly favors watermark-based product identification, other technologies can also be used, including barcode, OCR, and product recognition by fingerprinting (e.g., SIFT, SURF, ORB, etc.).

Similarly, while the detailed arrangements focus on conveyor-based implementations, embodiments of the present technology can also be used to inspect, identify and inventory items presented by hand, or carried on the bottom of a shopping cart, etc.

Reference was made to some of the innovations associated with the conveyor. More generally, these may be regarded as falling into three classes: (1) aids in object recognition, to increase through-put and accuracy; (2) new features for the shopper; and (3) benefits for advertisers.

In the first class, markings on the conveyor can serve to identify the plane on which the objects rest—a helpful constraint in product recognition and object segmentation. The markings can also serve to identify the velocity of the conveyor, and any variations. Relatedly, the markings can serve as spatial references that help with pose estimation. In some embodiments, the markings serve as focus or calibration targets for one or more of the imaging systems. Such spatial reference information is also helpful to establish correspondence between information derived by different identification technologies (e.g., watermark and barcode).

Among new features for the shopper, such conveyor markings can define a lane (FIG. 8) on which the shopper can place coupons. The system is alert to this lane, and examines any imagery found there as candidate coupon imagery. When detected, the system responds according to known prior art coupon-processing methods.

The user may place their smartphone in this lane, with the display facing up. A coupon-redemption app on the smartphone may cyclically present different screens corresponding to different coupons. The system camera can detect these displayed coupons, and credit them accordingly. (The system camera can discern that the phone is on the conveyor belt—and not simply held over it—because its velocity matches that of the belt.). The smartphone may automatically start the screen display of coupons (e.g., it may activate the coupon redemption app) in response to input from its sensors, e.g., sensing motion along a horizontal plane using its accelerometers, or sensing certain strobed illumination characteristic of a checkout lane using its front-facing camera, etc.

Conversely, the user's smartphone on the moving belt can collect visual information projected onto the conveyor by the projector. This information can represent discount coupons, redeemable at a subsequent visit for merchandise related to that being purchased by the consumer.

The conveyor can serve as a projection screen, onto which imagery is projected by, e.g., an overhead projector. (Typically, the projector is obliquely angled towards the conveyor, with corrective optics to redress, e.g., keystoning.) As objects on the conveyor are recognized, the projector can present related information, such as item name and price, other suggested purchases, related recipes, digital coupons, etc. The projected imagery desirably follows the associated items as they travel along the conveyor.

The user can touch any of the indicia projected onto the conveyor. A camera senses the user's action (e.g., a camera adjacent the conveyor that captures imagery for item recognition, or a camera positioned with the projector). The system understands the camera-sensed action to indicate user interest in the touched indicia. Several responses may be triggered.

One simply is to freeze the projected indicia in place relative to the user (while the belt and items advance). This allows, e.g., the user to capture an image of the indicia with a personal device, e.g., a smartphone. (This allows the user later to explore the presented information, e.g., pursuing web links indicated by digital watermarks encoded in the projected indicia.)

Another system response is to present a video to the user. The video can be projected at a stationary location, such as on the conveyor (which may continue to advance under the projected video) or on a display screen (e.g., a screen on which the user's purchases are tallied).

Another response is to credit a coupon discount to the amount owed by the consumer. By presenting cash-back coupons to the consumer as items are being checked-out, the consumer can be incented to watch the conveyor (or other device where information is presented). Much of the projected information may be promotional in nature, and the viewer's attention can be maintained by periodically presenting a coupon.

The projected indicia be text, a logo, machine-readable data (e.g., barcode or watermark), etc. It may comprise a video.

For advertisers, the conveyor belt can be printed with brand messages, or carry temporary stickers for different branding events. In some instances the belt is dynamically printed each cycle, and wiped clean during its under-counter return. Known "white board" and "dry erase" markings can be used.

Figure 7:
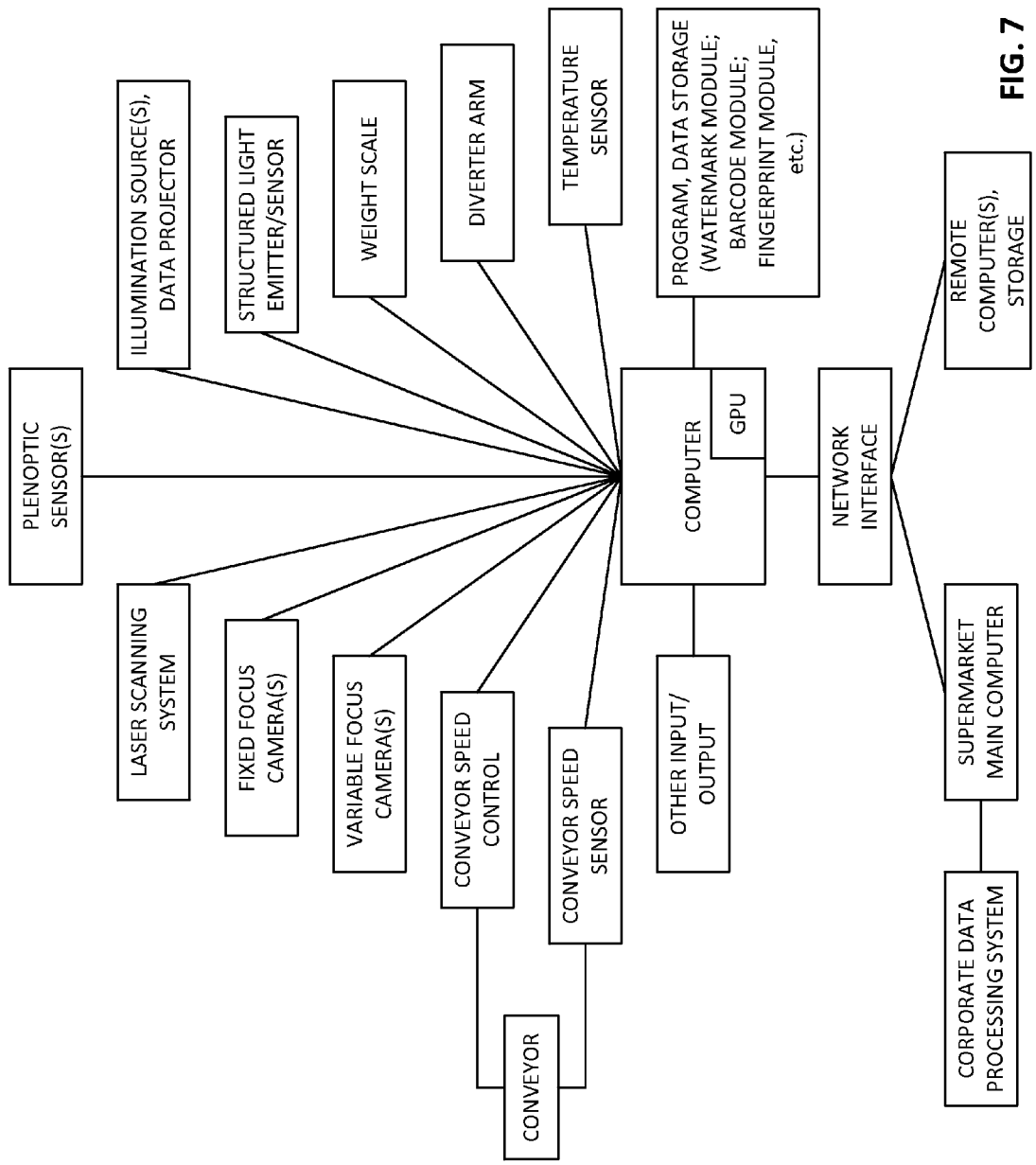
FIG. 7 shows a schematic illustration of a hardware arrangement of a particular embodiment.

Although the specification does not dwell on the point, the artisan will understand that the detailed checkout system is a component of a point-of-sale (POS) station, which typically includes a keyboard, a display, a cash drawer, a credit/debit card station, etc. The station, in turn, is networked with a main store computer system, which commonly includes a database system accessible by the POS stations. In turn, the main store computer system is typically networked across the internet, or otherwise, with a corporate data processing system. FIG. 7 schematically illustrates such arrangement.

Reference has been made to certain digital watermark indicia spanning a substantial portion of the packaging. This means at least 25% of the exposed surface area of the packaging. Increased performance can be achieved by increasing the coverage, e.g., to more than 50%, 75%, 90%, or 95%, of the exposed area—in some instances reaching 100% coverage.

Technology for encoding/decoding watermarks is detailed, e.g., in Digimarc's U.S. Pat. Nos. 6,912,295, 6,721,440, 6,614,914, 6,590,996, 6,122,403, and 20100150434.

Laser scanners used in supermarket checkouts are specialized, expensive devices. In contrast, certain embodiments of the present technology use mass-produced, low-cost cameras—of the sort popular in HD video chat applications. (The Logitech HD Webcam C615 captures 1080p video, and retails for less than $100.)

Such cameras commonly include sensors that respond down into the infrared spectrum, but such response is typically blocked by IR-reflective films. Such sensors can be used without the IR-blocking film to sense IR as well as visible light. As detailed in the cited watermarking patents (e.g., U.S. Pat. Nos. 6,912,295 and 6,721,440), use of IR sensing allows watermark and barcode information to be encoded in regions that—to a human—appear uniformly colored.

While certain embodiments made use of image frames oriented at regular 15 degree increments, this is not essential. One alternative embodiment uses one frame parallel to the camera, four frames that are angled at least 20 degrees away from the first frame (e.g., two at +/−25 degrees in a horizontal direction, and two more at +/−25 degrees in a vertical direction), and four more frames that that are angled at least 50 degrees away from the first frame (e.g., two at +/−55 degrees horizontally, and two at +/−55 degrees vertically). This set of nine image frames provides a good diversity of item views, allowing simple watermark and barcode decoders to reliably decode indicia from most surfaces viewable from a camera—regardless of the surfaces' orientations.

While certain embodiments discerned the geometrical pose of component patches on the items being checked-out, and then processed the imagery depicting such patches so as to yield processed imagery showing the patches as if presented squarely to the camera, in other embodiments, this latter action is not necessary. Instead, the discerned pose information can be provided to the system module that derives product identification information. Such module can then work with the original imagery, expecting its geometrically distorted state, and discerning the identification information taking such distortion into account.

In the detailed embodiment, the geometrical pose information for component surfaces on products/packaging is discerned from the camera imagery. In other implementations, the pose information can be determined otherwise. One such alternative is to use the Microsoft Kinect sensor device to sense the 3D environment. Tools extending the use of such device far beyond its original gaming application are now widely available. Microsoft, for example, distributes a software development kit ("Kinect for Windows SDK") that enables programmers to use the sensor's various capabilities in arbitrary applications. Open source drivers for the Kinect sensor are available from Adafruit Industries and PrimeSense, Ltd. In a further aspect of the present technology, such a sensor is used in assessing the pose of product surfaces at a supermarket checkout.

Unlike some other pose-assessment arrangements, the Kinect sensor does not rely on feature extraction or feature tracking. Instead, it employs a structured light scanner (a form of range camera) that works by sensing the apparent distortion of a known pattern projected into an unknown 3D environment by an infrared laser projector, and imaged by a monochrome CCD sensor. From the apparent distortion, the distance to each point in the sensor's field of view is discerned.

At the 2011 SIGGRAPH conference, Microsoft researchers demonstrated use of a movable Kinect sensor to generate a volumetric model of an unknown space (Azadi et al, KinectFusion: Real-Time Dynamic 3D Surface Reconstruction and Interaction). The model relies on continually-tracking 6DOF information about the sensor (e.g., defining its X-, Y-, and Z-position, and its pitch/roll/yaw orientation, by auxiliary sensors), and uses this information—with the depth data output from the moving range sensor system—to generate a 3D model of the space. As the sensor is moved, different views of the scene and objects are revealed, and these are incorporated into the evolving 3D model.

In Kinect-related embodiments of the present technology, the sensor typically is not moved. Its 6DOF information is fixed. Instead, the items on the checkout conveyor move. Their motion is typically in a single dimension (along the axis of the conveyor), simplifying the volumetric modeling. As different surfaces become visible to the sensor (as the conveyor moves), the model is updated to incorporate the newly-visible surfaces. The speed of the conveyor can be determined by a physical sensor, and corresponding data can be provided to the modeling system.

In addition to providing pose information for component item surfaces, such arrangement provides an additional manner of product identification—by volumetric product configuration. Some existing products have distinctive shapes (the classic glass Coke bottle is one example), and packaging for others readily could be tailored to impart a distinctive product configuration. Even features as small as 1 mm in size can be discerned by such volumetric modeling, allowing logos and other distinctive markings to be presented on products/packaging in raised embossing, or depressed engraving, fashion. Volumetric data from an item can be used, at checkout, for product identification—matching against a catalog of reference volumetric product configuration data (in a manner akin to present use of image fingerprinting for product identification).

In an implementation that uses the Kinect sensor for pose determination and/or volumetric configuration sensing, the Kinect RGB camera can be used as the sensor for capturing imagery from which other product identification information is determined. In such embodiments a checkout conveyor can be marked with volumetrically-sensible features, such as raised grooves or other prominences, embossed logos, etc. Such features can be used in a manner akin to the conveyor markings described earlier.

In many implementations, volumetric modeling is not used independently for product identification. Instead, it is one aspect of a multi-feature identification procedure—the components of which contribute different evidence to a decision module that tests different product identification Bayesian hypotheses until one emerges as the winner.

One component of such a multi-feature identification procedure may provide volumetric product configuration information. Another component may provide color histogram data generated from RGB imagery depicting the product. Another may provide barcode data (which may be incomplete or ambiguous). Another may contribute digital watermark data. Another may provide NFC/RFID information. Another may provide image fingerprint data. Another may contribute recognized text (OCR) data. Another may contribute weight information (e.g., from a conveyor weigh scale). Another may contribute item temperature information (e.g., discerned from infrared camera imagery). Another may provide information about relative placement of different items (a consumer is more likely to put a 12-pack of soda on top of a bag of dog food than on top of a bag of potato chips). Etc. Not all such information may be present for all items, depending on item characteristics, the manner in which the items are arrayed on a conveyor, availability of sensors, etc.

Outputs from plural such components are provided to a decision module that determines which product identification is most probably correct, giving the ensemble of input information (FIG. 5). This module can rely on reference information about products in the store's inventory, stored in a database or other data structure. It can likewise rely on analysis rules, stored in similar fashion. These rules may cause the module to accord the different input information with different evidentiary weight, depending on circumstances and candidate item identifications.

For example, if a weight sensor indicates an item weighs 12 ounces, the rules can specify that this is highly probative that the item is not a 40 pound bag of dog food. However, the rules may indicate that such information is of little value in determining whether the item is a can of corn or beans (for which the stored rules may indicate color histogram data has a greater discriminative value). Similarly, if a cylindrical carton is sensed to have a temperature below freezing, this is strong collaborating evidence that the item may be a container of ice cream, and is negating evidence that the item is a container of oats.

In one illustrative implementation, the decision module performs a staged analysis. Tests that are fastest, and/or simplest, are performed early, and are used to rule-out large numbers of possible items from the store's catalog of inventory. For example, if the weigh scale indicates a weight of one pound, all items having weights above three pounds may be disqualified immediately (e.g., six- and twelve-packs of soda, large containers of liquid detergent, 40 pound bags of dog food, etc.). Tests that are highly discriminative, e.g., having the potential to identify a single item out of the store's catalog (analysis of captured data for digital watermark and barcode information is of this sort), may also be applied early in the staged process.

Figure 6:
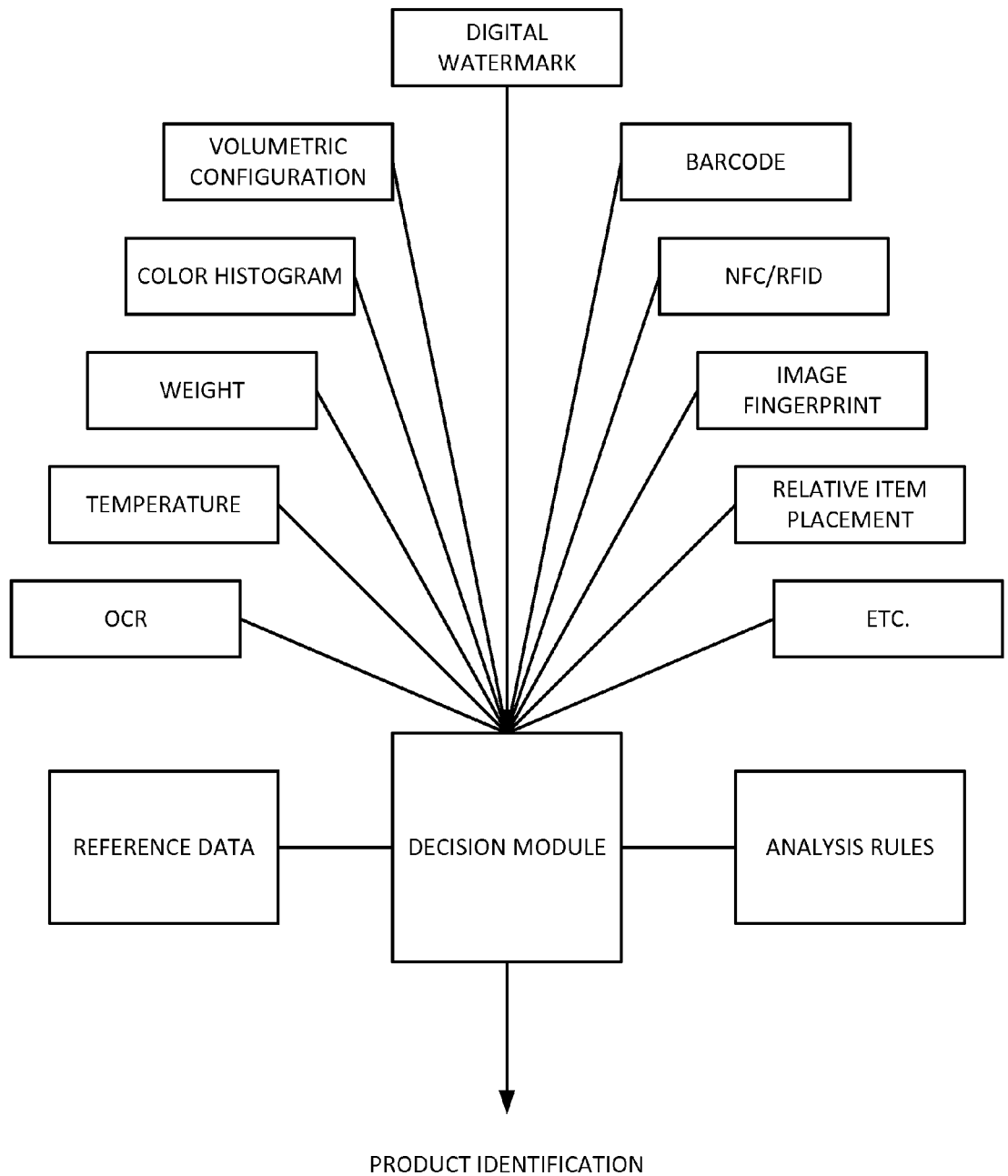
FIG. 6 shows a schematic illustration of a checkout system that considers multiple different types of input information, in conjunction with stored analysis rules and reference data, to determine product identification.

Generally speaking, a minority of the products in a supermarket comprise most of the sales volume. Coke is seen frequently on checkout counters; not so with smoked oysters and obscure ethnic condiments. Desirably, the checkout system is optimized for recognition of the products that constitute most of the volume. Thus, for example, the analysis rules in the embodiment of FIG. 6 may be selected, and ordered, to most quickly identify the most popular grocery items.

Such a system may be self-learning. A new product may be recognized, initially, by an express identifier, such as a watermark or a barcode. Through repeated exposure, the system collects information about image fingerprints, weights, color histograms, temperature, etc., that it associates with such product. Later, the system becomes able to recognize the item even without reference to the original identifier.

In some staged recognition systems, data from one stage of the analysis is used in determining an order of a later part of the analysis. For example, information captured in the first stage of analysis (e.g., color histogram data) may indicate that the item is probably a carton of Diet Coke product, but may leave uncertain whether it is a 6-pack or a 12-pack. This interim result can cause the analysis next to consider the item weight. If the item weighs between 9 and 10 pounds, it can be identified as highly likely to be a 12-pack carton of Diet Coke. If the item weighs half that amount, it can be identified as highly likely to be a 6-pack. (If it weighs less than 4.5 pounds, the initial identification hypothesis is strongly refuted.)

In contrast, if the initial histogram indicates the product is likely a carton of Reese's product, but leaves uncertain whether the carton contains ice cream bars or peanut butter cups, a temperature check may next be considered to most quickly reach a reliable item identification.

The rules data consulted by the decision modulation assign weighting values to different evidentiary parameters and different items. These values are used to determine an evolving probabilistic certainty that a tentative product identification is correct. When the decision module has considered enough evidence to make a product identification with a probabilistic certainty exceeding a threshold value (e.g., 99.99%), further analysis is skipped, the module outputs the product identification, and it can then consider a next item in the checkout. If all of the available evidence is considered, and the threshold certainty value is not met, this circumstance can be flagged to a human operator (e.g., providing an image of the item and/or other associated item information) for follow-up.

In a related implementation, a voting arrangement is used, with different identification technologies each casting virtual votes for different item identifications. The votes of some identification technologies may be more heavily weighted than others, reflecting their greater granularity of identification, or reliability of identification. The item identification with the most votes wins.

In some embodiments, an item that is not reliably identified—after consideration of all the available evidence, is physically diverted so that the flow of subsequent items through the checkout procedure is not stopped while the troublesome item is manually examined. Such diversion can be by an arrangement such as compressed air, a diverting arm, or a trap door.

Known supermarket checkout systems, such as those by Datalogic, NCR, Fujitsu, etc., can be adapted to incorporate some or all of the technology detailed herein.

While detailed in the context of a supermarket checkout implementation, it will be recognized that the present technologies can be used in other applications, including postal and courier package sorting, manufacturing lines, etc. Moreover, within the retail market, the technology can be employed in shopping cart-based implementations, and in implementations involving handheld reading devices (e.g., shoppers' or store clerks' PDA-like devices, such as smartphones).

In some embodiments, a wireless PDA-like device is used in conjunction with one or more fixed cameras to gather imagery from a checkout station. Typically, the wireless device is operated by a store clerk, but alternatively a smartphone owned and operated by a shopper can be used in this role. Some newer smartphones (e.g., the HTC PD29100) include multiple cameras, which can be used advantageously in the detailed arrangements.

In addition to the cited HTC model, particularly contemplated smartphones include the Apple iPhone 4, and smartphones following Google's Android specification (e.g., the Verizon Droid Eris phone, manufactured by HTC Corp., and the Motorola Droid 3 phone).

(Details of the iPhone, including its touch interface, are provided in Apple's published patent application 20080174570.)

The design of computer systems used in implementing the present technology is familiar to the artisan. In general terms, each includes one or more processors, one or more memories (e.g. RAM), storage (e.g., a disk or flash memory), a user interface (which may include, e.g., a keypad or keyboard, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, CDMA, W-CDMA, CDMA2000, TDMA, EV-DO, HSDPA, WiFi, WiMax, or Bluetooth, and/or wired, such as through an Ethernet local area network, a T-1 internet connection, etc).

The processes and system components detailed in this specification may be implemented as instructions for computing devices, including general purpose processor instructions for a variety of programmable processors, including microprocessors (e.g., the Atom and A4), graphics processing units (GPUs, such as the nVidia Tegra APX 2600), and digital signal processors (e.g., the Texas Instruments TMS320 series devices), etc. These instructions may be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of content signal data may also be distributed among different processor and memory devices. "Cloud" computing resources can be used as well. References to "processors," "modules" or "components" should be understood to refer to functionality, rather than requiring a particular form of implementation.

Software instructions for implementing the detailed functionality can be authored by artisans without undue experimentation from the descriptions provided herein, e.g., written in C, C++, Visual Basic, Java, Python, Tcl, Perl, Scheme, Ruby, etc. Certain implementations of the present technology can be use different software modules for performing the different functions and acts.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

Different of the functionality can be implemented on different devices. For example, certain of the image processing operations can be performed by a computer system at a checkout counter, and other of the image processing operations can be performed by computers in "the cloud."

(In like fashion, data can be stored anywhere: in a local device, in a networked, remote device, in the cloud, distributed between such devices, etc.)

While certain aspects of the technology have been described by reference to illustrative methods, it will be recognized that apparatus configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

Plenoptic cameras are available, e.g., from Lytro, Inc., Pelican Imaging Corp., and Raytrix, GmbH. Some of their work is detailed in patent publications 20110122308, 20110080487, 20110069189, 20070252074, 20080266655, 20100026852, 20100265385, 20080131019 and WO/2010/121637. The big consumer camera manufacturers are also understood to have prototyped such products, as has Adobe Systems, Inc. Some of Adobe's work in this field is detailed in U.S. Pat. Nos. 7,620,309, 7,949,252, 7,962,03.

Artisans sometimes draw certain distinctions between plenoptic sensors, light field sensors, radiance cameras, and multi-aperture sensors. The present specification uses these terms interchangeably; each should be construed so as to encompass the others.

Technology for supermarket checkout stations, incorporating imagers, is shown in U.S. patent documents 20040199427, 20040223663, 20090206161, 20090090583, 20100001075, U.S. Pat. Nos. 4,654,872, 7,398,927 and 7,954,719.

The present disclosure details a variety of technologies. For purposes of clarity, they are described separately. However, it will be recognized that they can be used together. While each such combination is not literally detailed, it is applicant's intent that they be so-combined.

Similarly, while this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated.

This disclosure is supplemented by appendices that more particularly detail the modeling of a 3D surface using imagery from different viewpoints.

Appendix A (by A. Alattar) provides a detailed derivation of how to estimate projective transform from two views of an object.

Appendix B is an excerpt from the PhD thesis of Snavely, "Scene Reconstruction and Visualization from Internet Photo Collections," University of Washington, 2008. These excerpts teach how corresponding image features in different images can be identified, and how the geometries of the two images can thereby be spatially related. This appendix also teaches "structure through motion" methods. (Snavely's work is also detailed in published patent application 20070110338.)

Appendix C is a review of perspective, based on the Wikipedia article "3D Projection."

The Wikipedia article "Structure from Motion" (Appendix D) provides additional information on such technology, and includes links to several such software packages. These include the Structure from Motion toolbox by Vincent Rabaud, Matlab Functions for Multiple View Geometry by Andrew Zissermann, the Structure and Motion Toolkit by Phil Torr, and the Voodoo Camera Tracker (a tool for integrating real and virtual scenes, developed at the University of Hannover).

Such methods are also known from work in simultaneous location and mapping, or SLAM. A treatise on SLAM is provided in Durrant-Whyte, et al, Simultaneous Localisation and Mapping (SLAM): Part I The Essential Algorithms, and Part II State of the Art, IEEE Robotics and Automation, Vol. 13, No. 2 (pp. 99-110) and No. 3 (pp. 108-117), 2006. One implementation of SLAM adapted to operate even on mobile device CPUs/GPSs is available from $13^{th}$ Lab, AB.

OpenSource implementations of SLAM are widely available; many are collected at OpenSLAM<dot>org. Others include the CAS Robot Navigation Toolbox (at www<dot>cas<dot>kth<dot>se/toolbox/index<dot>html), Matlab simulators for EKF-SLAM, UKF-SLAM, and FastSLAM 1.0 and 2.0 at www<dot>acfr<dot>usyd<dot>edu<dot>au/homepages/academic/tbailey/software/index<dot>html; Scene, at www<dot>doc<dot>ic <dot>ac<dot>uk/~ajd/Scene/index<dot>html; and a C language grid-based version of FastSLAM at www<dot>informatik<dot>uni-freiburg<dot>de/~haehnel/old/download<dot>html. (The <dot>convention is used so that this text is not rendered in hyperlink form by browsers, etc.)

SLAM is well suited for use with uncalibrated environments, as it defines its own frame of reference. Embodiments of the technology that employ handheld scanning devices (e.g., tethered hand-scanners, or wireless smartphones) are thus particularly suited for use with SLAM methods.

Appendices E and F are Wikipedia articles concerning Plenoptic Cameras and Light Field.

Other arrangements for generating 3D information from plural images are detailed in patent publications 20040258309, 20050238200, 20100182406, 20100319100, U.S. Pat. Nos. 6,137,491, 6,278,460, 6,760,488 and 7,352,386. Related information is detailed in applicant's pending application Ser. No. 13/088,259, filed Apr. 15, 2011.

Prior art technologies for supermarket checkout, and object identification, are detailed in the following patent publications owned by Datalogic, a leader in the field: 20070084918, 20060147087, 20060249581, 20070267584, 20070284447, 20090152348, 20100059589, 20100213259, 20100217678, 20100158310, 20100123005, 20100163628, and 20100013934.

Feature Recognition

Reference has been made to SIFT, SURF, and ORB feature recognition techniques.

Generally speaking, such techniques rely on locations within an image where there is a significant local variation with respect to one or more chosen image features—making such locations distinctive and susceptible to detection. Such features can be based on simple parameters such as luminance, color, texture, etc., or on more complex metrics (e.g., difference of Gaussians). Each such point can be represented by data indicating its location within the image, the orientation of the point, and/or a feature vector representing information associated with that location. (A feature vector commonly used in SURF implementations comprises 64 data, detailing four values of luminance gradient information for each of 16 different square pixel blocks arrayed around the interest point.)

Such image features may comprise individual pixels (or sub-pixel locations within an image), but these technologies typically focus on 2D structures, such as corners, or consider gradients within square areas of pixels.

SIFT is an acronym for Scale-Invariant Feature Transform, a computer vision technology pioneered by David Lowe and described in various of his papers including "Distinctive Image Features from Scale-Invariant Keypoints," International Journal of Computer Vision, 60, 2 (2004), pp. 91-110; and "Object Recognition from Local Scale-Invariant Features," International Conference on Computer Vision, Corfu, Greece (September 1999), pp. 1150-1157, as well as in U.S. Pat. No. 6,711,293.

SIFT works by identification and description—and subsequent detection—of local image features. The SIFT features are local and based on the appearance of the object at particular interest points, and are robust to image scale, rotation and affine transformation. They are also robust to changes in illumination, noise, and some changes in viewpoint. In addition to these properties, they are distinctive, relatively easy to extract, allow for correct object identification with low probability of mismatch and are straightforward to match against a (large) database of local features. Object description by a set of SIFT features is also robust to partial occlusion; as few as three SIFT features from an object are enough to compute its location and pose.

The technique starts by identifying local image features ("keypoints") in a reference image. This is done by convolving the image with Gaussian blur filters at different scales (resolutions), and determining differences between successive Gaussian-blurred images. Keypoints are those image features having maxima or minima of the difference of Gaussians occurring at multiple scales. (Each pixel in a difference-of-Gaussian frame is compared to its eight neighbors at the same scale, and corresponding pixels in each of the neighboring scales (e.g., nine other scales). If the pixel value is a maximum or minimum from all these pixels, it is selected as a candidate keypoint.

(It will be recognized that the just-described procedure is a blob-detection method that detects space-scale extrema of a scale-localized Laplacian transform of the image. The difference of Gaussians approach is an approximation of such Laplacian operation, expressed in a pyramid setting.)

The above procedure typically identifies many keypoints that are unsuitable, e.g., due to having low contrast (thus being susceptible to noise), or due to having poorly determined locations along an edge (the Difference of Gaussians function has a strong response along edges, yielding many candidate keypoints, but many of these are not robust to noise). These unreliable keypoints are screened out by performing a detailed fit on the candidate keypoints to nearby data for accurate location, scale, and ratio of principal curvatures. This rejects keypoints that have low contrast, or are poorly located along an edge.

More particularly this process starts by—for each candidate keypoint—interpolating nearby data to more accurately determine keypoint location. This is often done by a Taylor expansion with the keypoint as the origin, to determine a refined estimate of maxima/minima location.

The value of the second-order Taylor expansion can also be used to identify low contrast keypoints. If the contrast is less than a threshold (e.g., 0.03), the keypoint is discarded.

To eliminate keypoints having strong edge responses but that are poorly localized, a variant of a corner detection procedure is applied. Briefly, this involves computing the principal curvature across the edge, and comparing to the principal curvature along the edge. This is done by solving for eigenvalues of a second order Hessian matrix.

Once unsuitable keypoints are discarded, those that remain are assessed for orientation, by a local image gradient function. Magnitude and direction of the gradient is calculated for every pixel in a neighboring region around a keypoint in the Gaussian blurred image (at that keypoint's scale). An orientation histogram with 36 bins is then compiled—with each bin encompassing ten degrees of orientation. Each pixel in the neighborhood contributes to the histogram, with the contribution weighted by its gradient's magnitude and by a Gaussian with σ 1.5 times the scale of the keypoint. The peaks in this histogram define the keypoint's dominant orientation. This orientation data allows SIFT to achieve rotation robustness, since the keypoint descriptor can be represented relative to this orientation.

From the foregoing, plural keypoints are different scales are identified—each with corresponding orientations. This data is invariant to image translation, scale and rotation. 128 element descriptors are then generated for each keypoint, allowing robustness to illumination and 3D viewpoint.

This operation is similar to the orientation assessment procedure just-reviewed. The keypoint descriptor is computed as a set of orientation histograms on (4×4) pixel neighborhoods. The orientation histograms are relative to the keypoint orientation and the orientation data comes from the Gaussian image closest in scale to the keypoint's scale. As before, the contribution of each pixel is weighted by the gradient magnitude, and by a Gaussian with σ 1.5 times the scale of the keypoint. Histograms contain 8 bins each, and each descriptor contains a 4×4 array of 16 histograms around the keypoint. This leads to a SIFT feature vector with (4×4×8=128 elements). This vector is normalized to enhance invariance to changes in illumination.

The foregoing procedure is applied to training images to compile a reference database. An unknown image is then processed as above to generate keypoint data, and the closest-matching image in the database is identified by a Euclidian distance-like measure. (A "best-bin-first" algorithm is typically used instead of a pure Euclidean distance calculation, to achieve several orders of magnitude speed improvement.) To avoid false positives, a "no match" output is produced if the distance score for the best match is close—e.g., 25% to the distance score for the next-best match.

To further improve performance, an image may be matched by clustering. This identifies features that belong to the same reference image—allowing unclustered results to be discarded as spurious. A Hough transform can be used—identifying clusters of features that vote for the same object pose.

An article detailing a particular hardware embodiment for performing the SIFT procedure is Bonato et al, "Parallel Hardware Architecture for Scale and Rotation Invariant Feature Detection," IEEE Trans on Circuits and Systems for Video Tech, Vol. 18, No. 12, 2008. Another is Se et al, "Vision Based Modeling and Localization for Planetary Exploration Rovers," Proc. of Int. Astronautical Congress (IAC), October, 2004.

Published patent application WO07/130,688 concerns a cell phone-based implementation of SIFT, in which the local descriptor features are extracted by the cell phone processor, and transmitted to a remote database for matching against a reference library.

While SIFT is perhaps the most well known technique for generating robust local descriptors, there are others, which may be more or less suitable—depending on the application. These include GLOH (c.f., Mikolajczyk et al, "Performance Evaluation of Local Descriptors," IEEE Trans. Pattern Anal. Mach. Intell., Vol. 27, No. 10, pp. 1615-1630, 2005); and SURF (c.f., Bay et al, "SURF: Speeded Up Robust Features," Eur. Conf. on Computer Vision (1), pp. 404-417, 2006; as well as Chen et al, "Efficient Extraction of Robust Image Features on Mobile Devices," Proc. of the 6th IEEE and ACM Int. Symp. On Mixed and Augmented Reality, 2007; and Takacs et al, "Outdoors Augmented Reality on Mobile Phone Using Loxel-Based Visual Feature Organization," ACM Int. Conf. on Multimedia Information Retrieval, October 2008. A feature vector commonly used in SURF implementations comprises 64 data, detailing four values of luminance gradient information for each of 16 different square pixel blocks arrayed around the interest point.)

ORB feature-based identification is detailed, e.g., in Calonder et al, BRIEF: Computing a Local Binary Descriptor Very Fast, EPFL Computer Vision Laboratory Technical Report 2011 (to appear in IEEE Transactions on Pattern Analysis and Machine Intelligence); Calonder, et al, BRIEF: Binary Robust Independent Elementary Features, ECCV 2010; and Rublee et al, ORB: an efficient alternative to SIFT or SURF, ICCV 2011. ORB, like the other noted feature detection techniques, is implemented in the popular OpenCV software library (e.g., version 2.3.1).

Concluding Remarks

From the present disclosure—including the noted sources, an artisan can implement embodiments of the present technology without undue experimentation.

Although features and arrangements are described, in some cases, individually, the inventors intend that they will also be used together. Conversely, while certain systems are detailed as including multiple features, the inventors conceive that—in other embodiments—the individual features thereof are usable independently.

To provide a comprehensive disclosure, while complying with the 35 USC Section 112 requirement of conciseness, applicant incorporates-by-reference the patent and other documents referenced herein (including the documents referenced in the appendices, which form part of this specification). Such materials are incorporated in their entireties, even if cited above in connection with specific of their teachings. These references disclose technologies and teachings that applicant intends be incorporated into the arrangements detailed herein, and into which the technologies and teachings detailed herein be incorporated. The reader is presumed to be familiar with such prior work.

I claim:

1. A method comprising the acts:

at a retail checkout, capturing imagery of an item to be purchased, said capturing including capturing a first 2D image depicting a first view of the item, and capturing a second 2D image depicting a second view of said item, the second view depicting an excerpt of the item not depicted in said first view, the item having moved a distance "d" between capture of the first and second images;

discerning first apparent geometric distortion of a first region of said item, as depicted in one of the captured images;

discerning second apparent geometric distortion of a second region of said item, as depicted in said one of the captured images, the second region being distinct from the first region, the second geometric distortion being different than the first geometric distortion;

applying a first geometric compensation to virtually remap the first region to mitigate said apparent first geometric distortion, the first geometric compensation employing a first projective transformation function; applying a second geometric compensation to virtually remap the second region to mitigate said apparent second geometric distortion, the second geometric compensation employing a second projective transformation function, the second projective transformation function being different than the first projective transformation function; and outputting resultant data; and processing the resultant data to derive item identification information, the item identification information being based on item printing that spans at least a portion of the first region and a portion of the second region;

wherein each of said discerning acts makes use of the distance "d".

2. The method of claim 1 that includes capturing the first 2D image using a first 2D image sensor, and capturing the second 2D image using the same first 2D image sensor.

3. The method of claim 1 that includes applying a first geometric compensation to said depiction of the first region, to yield a virtually flattened counterpart to said physically distorted first excerpt of the item surface.

4. The method of claim 3 in which the second geometric distortion is due to physical distortion of a second excerpt of the item surface, and the method includes applying a second geometric compensation to said depiction of the second region to yield a virtually flattened counterpart to said physically distorted second excerpt of the item surface.

5. The method of claim 4 in which said first and second geometric compensations yield virtually flattened co-planar counterparts to said physically distorted first and second excerpts of the item surface.

6. The method of claim 1 that further includes:

discerning third apparent geometric distortion of a third region of said item, as depicted in captured imagery, the third region being distinct from each of the first and second regions, the third geometric distortion being different than each of the first and second geometric distortions;

applying a third geometric compensation to virtually remap the third region to mitigate its apparent third geometric distortion, the third geometric compensation employing a third projective transformation function that is different than each of the first and second projective transformation functions, and outputting resultant data; and processing the resultant data to derive item identification information, the item identification information being based on item printing that spans at least a portion of the first region, a portion of the second region, and a portion of the third region;

wherein said act of discerning third apparent geometrical distortion makes use of the distance "d".

7. The method of claim 1 that further includes treating the item as comprising a collection of adjoining surface patches, each oriented at a different angle, and virtually remapping at least two of said patches to lie in a common plane.

8. The method of claim 1 in which the item to be purchased is packaged in a flexible bag, on which said printing is conveyed.

9. A retail checkout apparatus comprising:

an image capture portion coupled to a data processing portion and a memory, the memory containing instructions configuring the apparatus to perform acts including:

with the image capture portion, capturing imagery of an item to be purchased, said capturing including capturing a first 2D image depicting a first view of the item, and capturing a second 2D image depicting a second view of said item, the second view depicting an excerpt of the item not depicted in said first view, the item having moved a distance "d" between capture of the first and second images;

discerning first apparent geometric distortion of a first region of said item, as depicted in one of the captured images;

discerning second apparent geometric distortion of a second region of said item, as depicted in said one of the captured images, the second region being distinct from the first region, the second geometric distortion being different than the first geometric distortion;

applying a first geometric compensation to virtually remap the first region to mitigate said apparent first geometric distortion, the first geometric compensation employing a first projective transformation function; applying a second geometric compensation to virtually remap the second region to mitigate said apparent second geometric distortion, the second geometric compensation employing a second projective transformation function, the second projective transformation function being different than the first projective transformation function; and outputting resultant data; and processing the resultant data to derive item identification information, the item identification information being based on item printing that spans at least a portion of the first region and a portion of the second region;

wherein each of said discerning acts makes use of the distance "d".

* * * * *